United States Patent
Norrman

(10) Patent No.: US 7,201,573 B2
(45) Date of Patent: Apr. 10, 2007

(54) DEVICE FOR EMPTYING OF HOT PARTICLE MATERIAL FROM A CHAMBER INTO A TRANSPORT CONTAINER

(75) Inventor: Jan Norrman, Vaxholm (SE)

(73) Assignee: Waterman AB (SE)

( * ) Notice: Subject to any disclaimer, the term of this patent is extended or adjusted under 35 U.S.C. 154(b) by 45 days.

(21) Appl. No.: 10/538,436

(22) PCT Filed: Dec. 3, 2003

(86) PCT No.: PCT/SE03/01874

§ 371 (c)(1),
(2), (4) Date: Jun. 10, 2005

(87) PCT Pub. No.: WO2004/056679

PCT Pub. Date: Jul. 8, 2004

(65) Prior Publication Data

US 2006/0057532 A1 Mar. 16, 2006

(30) Foreign Application Priority Data

Dec. 20, 2002 (SE) .................................. 0203798

(51) Int. Cl.
*F27B 15/12* (2006.01)
(52) U.S. Cl. ........................... 432/16; 432/58; 110/245
(58) Field of Classification Search ................. 432/14, 432/15, 16, 58, 71, 86; 110/245
See application file for complete search history.

(56) References Cited

U.S. PATENT DOCUMENTS

| 3,732,062 | A | * | 5/1973 | Porteus | ........................ | 432/16 |
| 3,795,987 | A | * | 3/1974 | Kemmetmueller | ........... | 34/168 |
| 4,531,907 | A | * | 7/1985 | Kawamura | .................. | 431/170 |
| 4,552,203 | A | | 11/1985 | Chrysostome et al. | ...... | 165/300 |

FOREIGN PATENT DOCUMENTS

WO      WO-A-9411673        5/1994

OTHER PUBLICATIONS

International Search Report PCT/SE2003/001874 dated Mar. 12, 2004.

* cited by examiner

*Primary Examiner*—Gregory Wilson
(74) *Attorney, Agent, or Firm*—Ostrolenk, Faber, Gerb & Soffen, LLP

(57) ABSTRACT

A device for emptying hot particle material from a chamber into a transport container. The container is provided with a first pipe that can be inserted into the particle material in the chamber, and a second pipe that is connected to a vacuum source via a precipitator. The first and second pipes communicate with the upper part of the container and are spaced from each other to permit rejection of particle material in the container. The container has an outlet in its lower, downwardly narrowing part. The outlet is provided with a valve. A vertical chute surrounds the outlet, extends downwardly therefrom, and has an evacuation pipe for withdrawal of powder mixed with air that is generated inside the shaft, while particle material is being emptied through the outlet and outlet valve. The container includes a heat exchanger to cool the powder material deposited in the container. An air flow into the container.

9 Claims, 2 Drawing Sheets

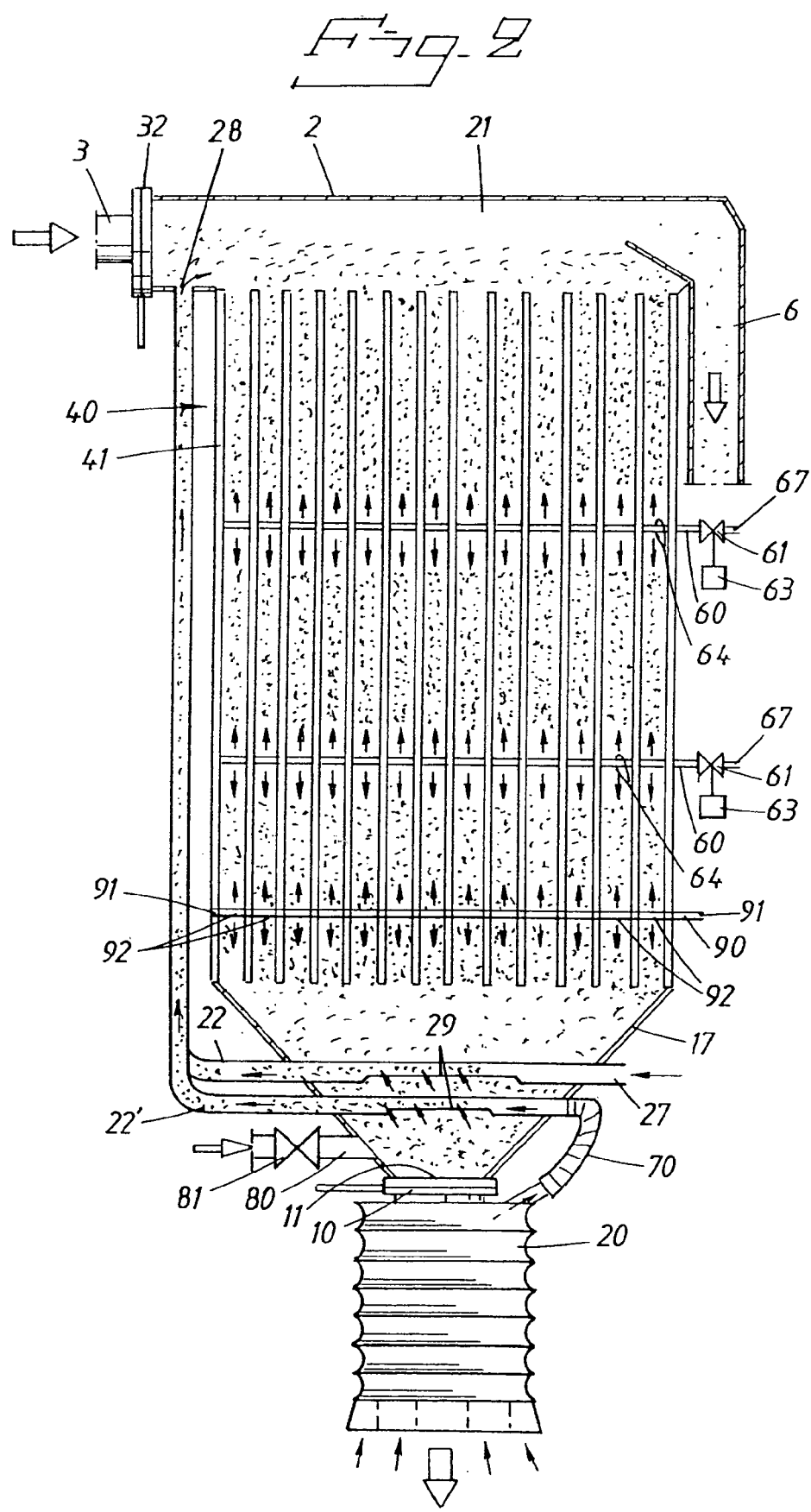

DEVICE FOR EMPTYING OF HOT PARTICLE MATERIAL FROM A CHAMBER INTO A TRANSPORT CONTAINER

CROSS REFERENCE TO RELATED APPLICATIONS

The present application is a 35 U.S.C. §371 national phase conversion of International Application No. PCT/SE2003/001874 filed Dec.3, 2003, which claims priority from Swiss patent application No. 0203798-4 filed Dec. 20, 2002.

BACKGROUND OF THE INVENTION

The invention relates to a device for emptying hot particle material from a chamber into a transport container of the type and to aiding withdrawal of the powder.

It is in practice already known that the transport container, carried by an overhead crane in an industrial hall, has a first pipe such as a telescopic pipe that can be inserted into the particle material in the chamber, and a second pipe that is connected to a vacuum source via a powder separator, wherein the first and second pipes communicate with the upper part of the container and are spaced from each other, wherein the container has an outlet in its lower, downwardly narrowing part, said outlet being provided with a valve, for evacuation of particle material deposited in the container, and wherein a vertical chute which surrounds the outlet valve and extends downwardly therefrom, has an evacuation pipe connected to a negative pressure source for withdrawal of dust from the shaft when the container is being emptied.

A device of the type indicated is used, for instance, in plants producing graphite electrodes by a corresponding green electron being lowered into a chamber filled with particle material such as coal dust heated to high temperature. To enable removal of the finished electrode from the chamber, the hot coal particles must first be removed, after which the hot coal particles can be re-used in a similar chamber into which a green electrode has been inserted. Normally the hot particle material must be cooled before it can be introduced into a chamber for embedding a green electrode.

SUMMARY OF THE INVENTION

One object of the invention is to provide a device which enables the powder material to be cooled in an efficient manner. Another object of the invention is to design the device so that the powder material can easily be caused to flow out through the outlet valve of the container.

These objects are achieved by means of the invention.

The invention comprises a device for emptying hot particle material from a chamber into a transport container. The container is provided with a first pipe that can be inserted into the particle material in the chamber, and a second pipe that is connected to a vacuum source via a precipitator. The first and second pipes communicate with the upper part of the container and are spaced from each other to permit rejection of particle material in the container. The container has an outlet in its lower, downwardly narrowing part. The outlet is provided with a valve. A vertical chute surrounds the outlet, extends downwardly therefrom, and has an evacuation pipe for withdrawal of powder mixed with air that is generated inside the shaft, while particle material is being emptied through the outlet and outlet valve. The container includes a heat exchanger to cool the powder material deposited in the container. An air flow into the container.

BRIEF DESCRIPTION OF THE DRAWINGS

The invention is illustrated schematically in FIG. 1.

FIG. 2 shows schematically a section through the transport container of the device.

DESCRIPTION OF A PREFERRED EMBODIMENT

Figure 1:
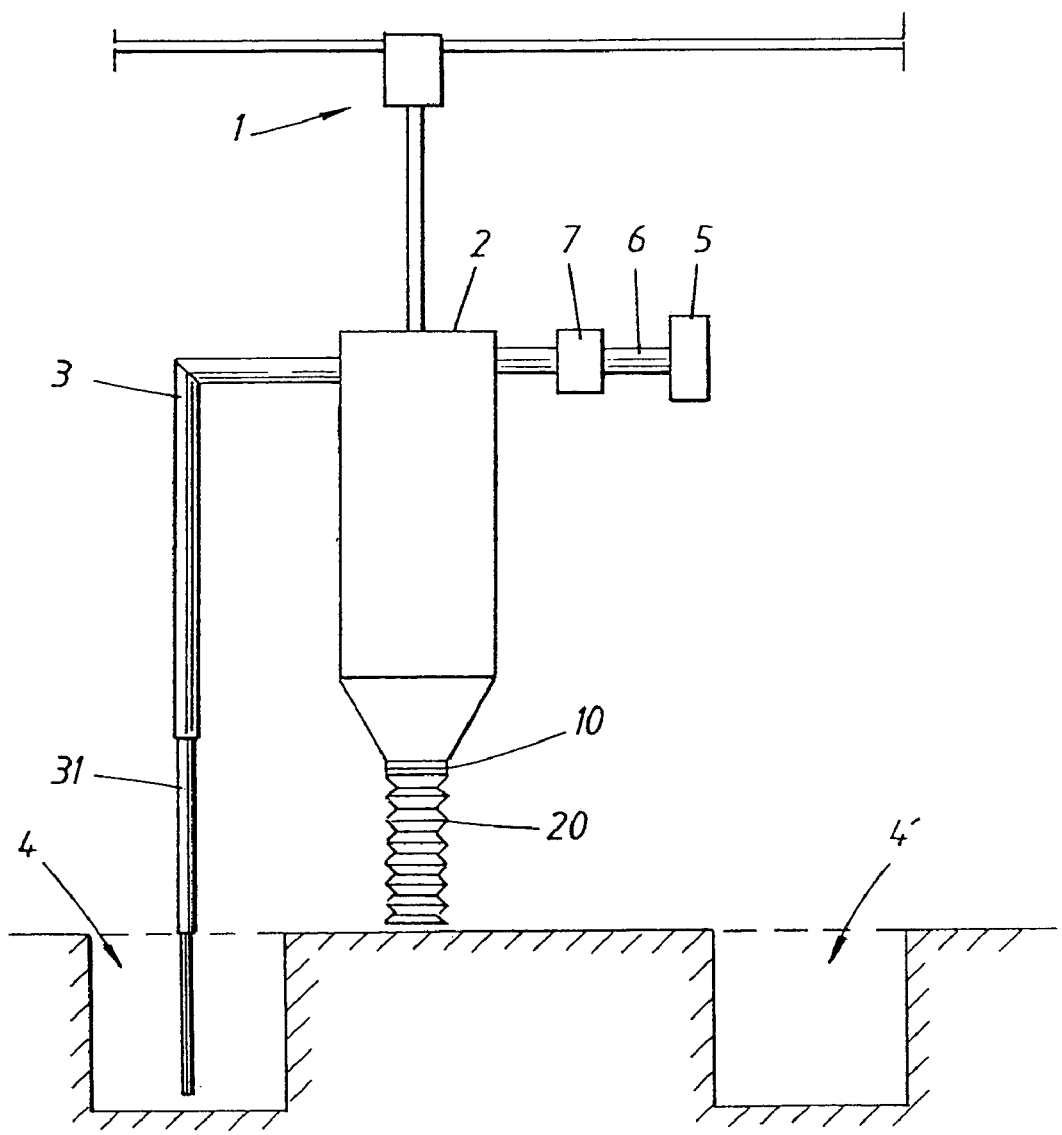
FIG. 1 illustrates an overhead crane 1 carrying a transport container 2.

The container 2 may be considered closed, a suction pipe 3 communicating with the upper part of the container 2 and having, for instance, a telescopic end section 31 which can be lowered into a chamber 4. Said chamber 4 constitutes, for instance, a graphitization furnace for graphite electrode blanks. A green graphite electrode is inserted in such a chamber and packed in particle material, e.g. coal, after which the particles in the chamber 4 are heated to high temperature.

When the product is ready the pipe section 31 is lowered into the particles in the chamber 4, the particle material then being drawn up through the pipe and deposited in the container 2 with the aid of a transport air-flow generated by a suction fan 5 which, via a suction pipe 6 communicates with the top of the container 2 via a precipitator 7 that separates any dust remaining in the air-flow to the fan 5.

The container 2 has a bottom outlet with a shut-off valve 10. A vertical chute 20 adjoins the bottom outlet of the container to surround and screen off a flow of particle material released through the outlet of the container 2 to a chamber 4' which is to be filled with particle material from the container 2 when the container 2 has been moved to the location of the chamber 4' by the overhead crane 1.

It can be seen in FIG. 2 that the pipes 3, 6 communicate with the upper part 21 of the container 2. The pipes 3 and 6 are suitably located in diametrically opposite areas of the container 2. In the main part of the container 2 below the precipitator 21 is a heat exchanger 40 through which a cooling fluid, suitably air, flows.

The heat exchanger 40 is shown in the form of parallel, plate-shaped, vertically oriented elements 41 through which the coolant flows. The air supply pipe 60 is shown extending generally horizontally through the interior of the container at several levels. Inside the container 2 the pipe 60 is provided with a plurality of air outflow openings spaced from each other and opening into the particle material between the heat-exchanger plates 41. The pipe 60 is supplied with compressed air at its inlet end 67 outside the container 2. Downstream of the end 67 is a valve 61 which is opened and closed, controlled by software 63.

The lower part of the container has a conically narrowing section 17 leading to the container outlet 11 provided with a valve 10. A pipe 22 extends through the container section 70 and has an inlet end 27 through which ambient air is drawn in. The pipe 22 has an outlet part 28 opening into the upper part 21 of the container 2. In the section of the pipe 22 extending through the container part 17 is an ejector pump 29 by means of which powder material is drawn into the air-flow of the pipe 22 and carried to the upper part 21 of the container by means of the negative pressure generated by the fan 5. Several such pipes 22 are shown extending through the container part 17. One pipe 22' is connected by means of a conduit 70, e.g. a hose, to the inside of the vertical chute 20. The latter may be in the form of a bellows, so that the ambient air is conducted via the chute 20 and hose 70 to the pipe 22'. Thus the dust generated inside the vertical shaft 20 when material flows through the valve 10 is returned to the upper part of the container 2.

The device shown in FIGS. 1 and 2 functions in that hot powder material from the chamber 4 is drawn up through the pipe 3 with the aid of an air-flow drawn by the fan 5 through the pipe 6 via the precipitator through the container 2 and pipe 3. A considerable amount of the powder material, e.g. 90 percent, then falls down into the lower part of the container while the rest is separated off and collected in the precipitator for re-use in a separate procedure.

The material deposited in the container is cooled by the elements 41 of the heat exchanger and set in motion by the air flowing out through the openings 64 in the compressed air supply pipe 60. The particle material that moves to the lower area of the container is drawn into the pipes 22 and returned to the upper part where, due to the force of gravity, it moves down in cooling contact with the cooling surfaces 40 of the heat exchanger. When the container 2 has been filled with material, and after a predetermined storage period for container and material, the container 2 is placed with its vertical chute 20 directed towards a chamber 4' to which the powder material shall be transferred. During emptying the suction fan 5 remains in operation, the inlet valve 32 of the pipe 3 is closed and the bottom valve 10 opened. One or more air induction pipes 80 with valves 81 are also connected to the lowermost part of the container 2. The valves 81, which are otherwise closed, are now opened so that air is drawn into the particle material in the lower part of the container. The total effect is that large quantities of air flow through the mass of powder material in the container 2 and are conducted through the pipe 6. The cooling effect is thus efficient while, at the same time, the negative pressure in the lower part of the container is equalized. The pre-requisite is thus established for the powder material to be able to flow down and out through the outlet 11 and valve 10 in the chute 20. Suction of dust through the hose 70 and pipe 22' also has a cooling effect on the powder material flowing down through the chute 20. The material has a temperature of, say, 600° C. at the inlet to the container 2 and the temperature in the outlet pipe may be around 250° C. The temperature of the material when it is emptied through the vertical chute 20 may be around 60° C.

Thanks to the invention the powder material collected in the container 2 can be efficiently cooled before being re-used or withdrawn from the container 2.

Thanks to the invention there is no need to temporarily remove the powder material from the container 2 for cooling before the powder is returned to the container 2 for transport to a site for use.

FIG. 2 also shows a pipe 90 extending transversely through the hollow heat-exchanger plates 41 and communicating with the interior thereof.

The pipes 90 have outflow openings 92 between the heat-exchanger bodies 41 so that air flows out through the openings 92 and reduces the negative pressure existing in the powder material between the heat-exchanger bodies 41.

If the heat-exchanger bodies 41 are plate-shaped and have walls consisting of relatively thin plates, the effect is achieved that air flowing out from the interior of the heat-exchanger bodies 41 into the spaces between the bodies 41 limits the negative pressure in these spaces, thereby limiting the tendency of adjacent plate walls of heat-exchanger bodies 41 in proximity of each other to be drawn towards each other by the pressure different over each plate. Furthermore, the air-flow out through the openings 92 causes the powder material to become fluidized so that it can flow down through the outlet 11 when the valve 10 is opened.

The ends 91 of the pipe 90 may also be open towards the surrounding atmosphere outside the walls of the container 2 to permit air to be drawn into the pipe 90 and out through the openings 92.

Naturally several such pipes 90 with openings 92, 91 may be arranged beside each other and at several levels in the container 2.

The invention claimed is:

1. A device for emptying hot particle material from a chamber into a transport container, comprising a first pipe that can be inserted into the particle material in the chamber and communicates into the container; and a second pipe that is connected from the container to a vacuum source via a powder separator, wherein the first and second pipes communicate with an upper part of the container and the pipes are spaced from each other to permit separation of particle material in the container, the container has a lower, downwardly narrowing part with an outlet therein, the outlet has a valve, a vertical chute surrounds the outlet and extends downwardly from the outlet, the chute has an evacuation pipe for withdrawal of a mixture of air and powder that is generated inside the chute while the particle material is being emptied through the outlet and the outlet valve, the container includes a heat-exchanger to cool the particle material deposited in the container, at least one compressed air tube extends into the interior of the container and the tube has a plurality of openings from which air flows, openings are open to the powder material therein, the compressed air tube has an inlet end that is supplied from a compressed air source and has a cut-off valve controlled by software for time-controlled forcing of compressed air into the powder material through the openings.

2. A device as claimed in claim 1, further comprising a suction tube having an outlet end that communicates with an interior of an upper part of the container, the suction tube has an inlet end that is supplied with ambient air, the suction tube having a section which extends through the lower part of the container and which contains an ejector through which powder material is carried by the air-flow through the tube.

3. A device as claimed in claim 1, further comprising a suction tube that communicates with the vertical chute and opens into the upper part of the container, the suction tube having a section which extends through the lower part of the container and is provided with an ejector.

4. A device as claimed in claim 1, further comprising an air induction tube is connected to the lower part of the container in the vicinity of the outlet and the induction tube has a valve.

5. A device as claimed in claim 1, wherein the vertical chute comprises a vertical chute bellows adapted to surround a jet of powder material flowing out through the outlet to a receiving chamber.

6. A device as claimed in claim 1, wherein the pipe for drawing powder material into the container is provided with a shut-off valve.

7. A device as claimed in claim 6, wherein when particle material is being emptied from the container, the valve in the pipe for drawing powder material into the container is arranged to be closed, while the negative pressure source remains activated, and the valve in the tube connected to the outlet part of the container is arranged to be opened to permit the particle material deposited in the container to flow out through the outlet when the outlet valve is opened.

8. A device as claimed in claim 1, wherein the heat-exchanger comprises a plurality of hollow heat-exchanger elements operable for cooling air to flow, at least one tube is arranged to extend between a plurality of the heat-exchanger elements to establish air communication between them, wherein the tube extending between the heat-exchanger bodies has openings through which air from the interior of the heat-exchanger bodies can flow out into the interior of the container.

9. A device as claimed claim 8, wherein the tube communicating between the heat-exchanger bodies has an end that communicates with the atmosphere outside the container.

\* \* \* \* \*